C. H. FREER.
AUTOMATIC SAFETY CHECK VALVE.
APPLICATION FILED MAY 31, 1921.

1,437,136. Patented Nov. 28, 1922.

INVENTOR:
Charles H. Freer.
By Atty.
Frederic M. Keeney.

Patented Nov. 28, 1922.

1,437,136

UNITED STATES PATENT OFFICE.

CHARLES H. FREER, OF LOS ANGELES, CALIFORNIA.

AUTOMATIC SAFETY CHECK VALVE.

Application filed May 31, 1921. Serial No. 473,663.

*To all whom it may concern:*

Be it known that I, CHARLES H. FREER, a citizen of the United States, residing in the city and county of Los Angeles and State of California, have invented a new and useful Automatic Safety Check Valve, of which the following is a specification.

This invention has relation to an improved check-valve, and has for its objects the provision of means for attaching the device to a water-gauge, means for automatically effecting a closure when the water-gauge is blown off, or removed, and means for manually effecting the closure of the valve when the water gauge is to be removed.

This invention consists in the combination with the stopple or check-valve member, of means for effecting a union with a water-gauge, means for closing the valve manually, and a drain-cock for draining the valve body when the manually operated valve element is shifted to the closed position.

Other objects are to prevent danger from scalding when the water-gauge is broken or blown off, and to effectually close the valve when desired.

Figure 1:
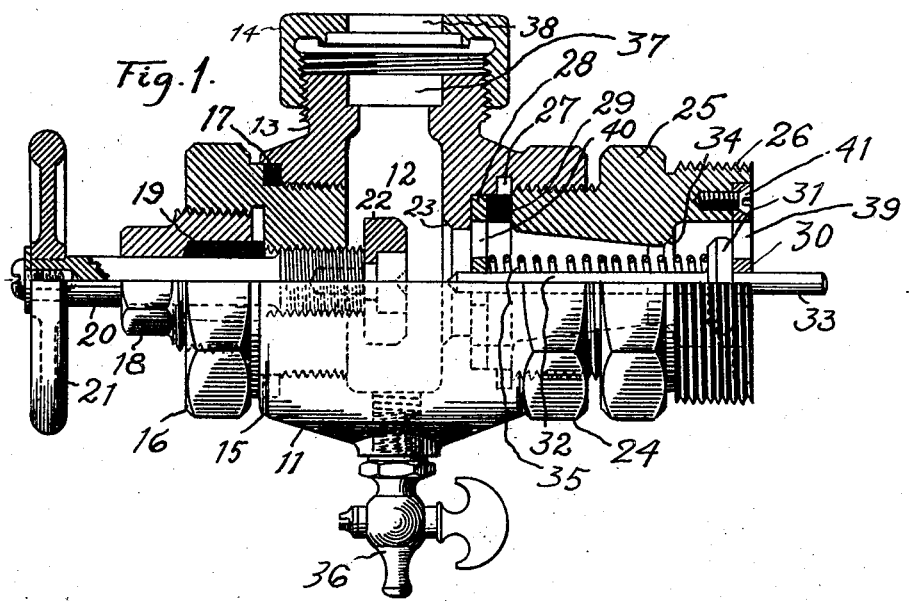
Figure 2:
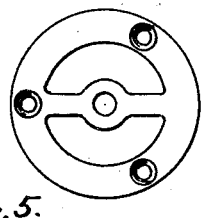
Figure 3:
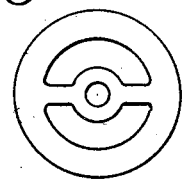
Figure 4:
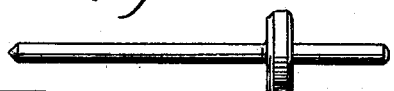
Figure 5:
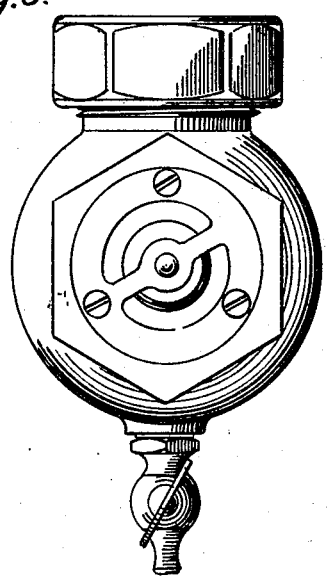

In the drawings, Figure 1 is a side view of the valve, with the upper part in section. Fig. 2 is a detail view of the guide for the check valve stem, and stop for the valve. Fig. 3 is a detail view of the combined valve stem guide member and abutment for the spring. Fig. 4 is a detail view of the valve member. Fig. 5 is an end elevation of my improved device.

Referring to the drawings, the invention consists in a device having the body 11 and water chamber 12, the body having the extension 13, on which screws the cap 14, to form a union with the water-glass (not shown). One end 15 is threaded to receive the cap 16, and is countersunk to receive the packing 17. A packing gland 18 screws into the cap 16, and retains the packing 19, around the valve stem 20, which is in threaded engagement with the cap 16. The valve-stem 20 is provided with a hand-wheel 21, for manual manipulation thereof and on the opposite end with a head 22, chamfered to engage with the valve seat 23, in chamber 12. The end 24, of the body is recessed and threaded to receive the check-valve body 25, which is provided with a threaded end 26, adapted to screw into a boiler. In the recess 27 is mounted the valve-stem guide and spring abutment 28, which is retained by the packing element 29, interposed between the guide 28 and check-valve body 25. The outer valve guide 30, is secured by screws 41 to valve body 25. The valve member 31, integral with the valve stem 32 and valve stem 33, is adapted to engage with valve seat 34, in member 25. A spring 35, encircling valve stem 32, and interposed between valve stem guide 28 and valve member 31, serves to maintain the check valve normally in the open position. The drain cock 36 is provided for emptying the chamber 12, prior to removing the water-glass.

In use, the part or check valve body 25 is screwed into the boiler, and the water-glass is attached to the extension 13, by the union collar 14, having the opening 38. The parts are normally in the position shown in Fig. 1, and the chamber 12 is filled with steam or water in accordance with the location of the device. Should the water-glass be broken or blown off, the steam or water rushing through the ports 39 in guide 30, and ports 40, in guide 28, acts upon the valve member 31 and forces the same into the valve seat 34. The steam pressure therefore immediately closes the communication with the chamber 12. The water-glass may be then replaced, and the hand wheel 21 is then turned so that the head 22 engages with the valve stem 32, to open valve 31 from the valve seat 34, whereupon the pressure in chamber 12 is equalized with the boiler pressure and valve member 31 is retained by the spring 35 in open position.

By the use of the above-described device, absolute safety is assured to the operator in case of accident to the water-glass, and at the same time an efficient means is provided for closing the boiler opening, to replace the water-glass. As long as there is pressure in the boiler, the valve member 31 will be retained in closed position when the water glass has been broken or removed, or until released by the closing of the valve member 22.

What is claimed is:

1. In a valve, the combination with a body member having a water chamber, and a drain cock in communication with the water chamber, of means for attaching the valve body to a water-glass, an inlet to the water chamber having a valve seat, a valve disk adapted to engage said seat and close said inlet, a valve stem for said valve disk, projecting from the casing of the body, a hand-wheel to operate the valve disk, a sleeve member having screw connection with the valve body on the inlet side of said valve seat, a guide member mounted in the end of the sleeve member, and having ports of communication, a guide member at the opposite end of the sleeve member and retained in position by the sleeve member, said sleeve member having a valve seat mid-way between the guide members, a valve element adapted to coact with the valve seat in the sleeve member to close the passage way therein, valve stems integral with the valve element and sliding in said guide members, and a spring interposed between the valve element and the inner guide member.

2. In a valve, the combination with a valve casing, having a water chamber, a drain cock for the water chamber, a valve seat in one end of the water chamber, a valve disk to coact with said valve seat, a union sleeve at the top of the water chamber, a threaded valve stem to actuate said valve disk, and a hand-wheel on the valve stem, of a sleeve member forming a lateral extension to the valve body on the inlet side of the valve seat, guide members at opposite ends of the sleeve member, said sleeve member having a valve seat between the guide members, a valve element arranged to co-act with the last-named valve seat, valve stems integral with the valve element and sliding in said guide members, and a spring interposed between the inner guide member and the valve element.

3. The combination with a valve body having a water chamber, a valve port arranged with a valve seat, a valve disk to co-act with the valve seat, a valve stem and hand wheel for manipulating the valve disk, a top extension, and a union sleeve engaging the top extension, of a sleeve forming a lateral extension to the valve body on the inlet side of the valve seat and having a passage way therein, and a valve seat in the passage way, guide members at the ends of the sleeve, a valve member sliding in said guide members and having a head adapted to engage with said last-named valve seat, and a spring interposed between the inner guide member, and the valve head.

In testimony whereof, I hereto affix my signature.

CHARLES H. FREER.